United States Patent [19]

Hinden et al.

[11] 4,454,169
[45] Jun. 12, 1984

[54] CATALYTIC PARTICLES AND PROCESS FOR THEIR MANUFACTURE

[75] Inventors: Jean Hinden, Chambésy; Michael Katz, Geneva; Jurgen Gauger, Thonex, all of Switzerland

[73] Assignee: Diamond Shamrock Corporation, Dallas, Tex.

[21] Appl. No.: 365,184

[22] Filed: Apr. 5, 1982

[30] Foreign Application Priority Data

Apr. 9, 1981 [GB] United Kingdom ........ 8111255

[51] Int. Cl.$^3$ ............................................. B05D 5/12
[52] U.S. Cl. ..................................... 427/125; 427/86; 427/216; 427/221; 204/290 R; 502/101
[58] Field of Search ....................... 252/425.3; 429/42; 427/86, 125, 126.3, 126.5, 216, 221; 204/290 R

[56] References Cited

U.S. PATENT DOCUMENTS

| 3,632,498 | 1/1972 | Beer | 204/290 F |
| 4,043,933 | 8/1977 | Breault et al. | 252/182 |
| 4,102,819 | 7/1978 | Petrow et al. | 252/460 |

FOREIGN PATENT DOCUMENTS

WO81/00973  4/1981  PCT Int'l Appl. .............. 252/425.3

*Primary Examiner*—F. Edmundson
*Attorney, Agent, or Firm*—John P. Hazzard; Arthur S. Collins

[57] ABSTRACT

Catalytic particles with an inert, corrosion resistant support material are provided with a catalyst finely dispersed in a matrix of an insoluble electrically conducting polymer formed in situ on each particle of inert support material.

The inert support particles are catalytically activated by:

(a) wetting them with a solution containing an inorganic precursor compound for the catalyst and an organic precursor compound for the insoluble polymer matrix, (b) drying the particles, and (c) heat treating them to convert the precursors to the catalyst dispersed in the polymer matrix.

An electrode, e.g. an oxygen-evolving anode, is produced by either fixing the catalytic particles to an electrode base, e.g. lead, or by consolidating the catalytic particles into a porous electrode body.

14 Claims, No Drawings

CATALYTIC PARTICLES AND PROCESS FOR THEIR MANUFACTURE

FIELD OF THE INVENTION

The invention relates to catalytic materials in the form of particles especially for use as electrocatalytic particles for the production of electrodes, as well as to their manufacture.

BACKGROUND OF THE INVENTION

Valve metals such as titanium, zirconium, tantalum and niobium exhibit film-forming properties which provide high corrosion resistance for use in anodes for electrolytic processes.

Dimensionally stable anodes with a titanium base and an electrocatalytic coating comprising a platinum group catalyst are widely used throughout the world for the electrolysis of brines. However, such anodes are subject to more or less rapid passivation in the presence of anodically evolved oxygen, thereby restricting their usefulness for anodic reactions involving the release of oxygen, e.g. as anodes for metal electrowinning processes.

The cost of titanium grids or sheets suitable as an electrode support also restricts their widespread use for operation at relatively low anodic current densities, e.g. in metal electrowinning.

Valve metal powders and more particularly titanium sponge are considerably cheaper than sheet or mesh and are of potential interest as a relatively inexpensive, stable, electrode material, or as a support material for catalysts in general.

Particulate valve metals such as titanium powder or sponge moreover provide a large surface for catalytic reactions, but do not, as such, exhibit adequate catalytic properties, and hence should be combined with catalysts suitable for carrying out desired reactions under industrially acceptable conditions.

Platinum group catalysts provide excellent catalytic properties for various processes but their high cost can at best be justified if they are employed efficiently in as small amounts as possible.

The economical use of platinum group catalysts to activate titanium powder or sponge, or other valve metals in the form of particles, would thus be of considerable interest to provide stable, relatively inexpensive catalytic materials suitable for various purposes, and more particularly for catalytic electrodes.

SUMMARY OF THE INVENTION

An object of the invention is to provide an inexpensive catalytic material in the form of particles of any desired size of shape.

Another object of the invention is to provide a simple process for the manufacture of such a particulate catalytic material in a reproducible manner.

A further object of the invention is to catalytically activate solid, inert support particles by means of any suitable catalyst evenly distributed on the particles so as to provide a large catalytically active surface.

A particular object of the invention is to provide a particulate valve metal thus activated by means of a small amount of platinum group catalyst.

The term "valve metal" as used herein is meant to cover titanium, zirconium, tantalum, niobium, alloys thereof, or any other suitable metals or alloys exhibiting filmforming properties which protect them from corrosion in use.

The terms "particulate" and "particles" are used herein in the broadest sense to designate any solid fragmentary material divided into a large number of more or less small fragments (particles as opposed to a single body) which have any desired size or shape, e.g., in the form of powders, granules, pellets, fibres, etc.

The term "platinum group metal" covers the six platinum group metals (Ru, Rh, Pd, Os, Ir, Pt) of the platinum group in the Periodic Table. Platinum group catalysts referred to herein comprise any metal of the platinum group, either in the metallic form, or as an oxide, or else in any other suitable stable, catalytic form.

The term "inert" as used herein with reference to the support material of the catalytic particles is understood to mean that this support material is substantially stable, corrosion-resistant and catalytically inactive, per se, under the intended conditions of manufacture and use of the catalytic particles. The support material will thus be physically stable, chemically and/or electrochemically inert under said conditions, while the required catalytic properties are essentially provided by the catalyst incorporated in the particles in accordance with the invention.

The invention provides a catalytic material in the form of particles, a process for its manufacture, and an electrode, as set forth in the claims.

Particles of any suitable solid inert support material may thus be catalytically activated in accordance with the invention by means of very small amounts of catalyst incorporated in the support particles via the insoluble polymer formed in situ on the particles. These particles may thus advantageously comprise a minor amount of a platinum group catalyst on a valve-metal forming a major portion, preferably more than 90% by weight of each particle.

Valve metals such as titanium may be advantageously used to provide a corrosion resistant, conductive, inert support material for the catalytically activated particles according to the invention.

Titanium powder may provide a suitable inert support material, while titanium sponge may be of particular interest due to its low cost, and also its high porosity. The activating solution used in accordance with the invention was found to allow controlled activation of titanium sponge with platinum group catalysts, in spite of the fact that titanium sponge is highly reactive in air due to its large pore surface.

The inert support particles activated in accordance with the invention will preferably be more or less porous, so that at least their outer portion may be impregnated with the activating solution, and that the solid, insoluble polymer subsequently formed in situ will thereby be solidly anchored in the porous surface of the particles, thus also fixing the catalyst finely dispersed in said polymer.

Other valve metals than titanium or corrosion-resistant non-valve metals may also be used as an inert support material, such as for example: Zr, Ta, Nb, Mo, W, Ni, Cr, Co, Mn, stainless steel.

Corrosion resistant oxides may likewise provide suitable support materials such as e.g. $TiO_2$, $ZrO_2$, $Al_2O_3$, $SiO_2$, $MnO_2$, $PbO_2$, as well as carbides, nitrides, borides, or silicates of metals such as: Ti, Zr, Ta, Nb, Mo, W, Cr, Al. Support particles comprising graphite or polymeric materials may also be suitable for the invention.

When the support particles are non-conductive, the polymer formed thereon during activation according to the invention may itself be able to impart adequate conductivity, if necessary, to the activated particles.

Suitable inert support particles may be catalytically activated in accordance with the invention by means of a minimum amount of catalyst which forms an extremely fine dispersion throughout the polymer matrix and thereby provides a maximum number of catalytic sites. Platinum group catalysts may thus be applied in a highly economical manner to activate inert support particles in accordance with the invention.

Other catalysts which may also be used in accordance with the invention, for example, Co, Ni, Mo, oxides or sulphides of Mn, Ni, Co, molybdates, tungstates, tungsten carbide, thio spinels.

The organic precursor used in the invention may advantageously consist of any suitable soluble polymer which can be thermally activated so as to undergo a structural change by extensive cross-linking and cyclization whereby to form aromatic or heteroaromatic rings, so as to thus be able to form a substantially continuous, planar, semi-conducting polymer structure.

Polyacrylonitrile (PAN) was successfully used according to the invention, as is described further below.

Some other polymers which may be suitable are: poly-p-phenylene, polyacrylamide or other derivatives of polyacrylic acid.

Soluble aromatic polymers may also be used in the invention, such as for example: aromatic polyamides, aromatic polyesters, polysulphones, aromatic polysulphides, epoxy, phenoxy, or alkyd resins containing aromatic building blocks, polyphenylenes or polyphenylene oxides, polyacenaphthylene.

Heteroaromatic polymers may further be suitable for the invention such as for example polyvinyl pyridine, polyvinylpyrolidone, or polytetrahydrofurane.

Soluble prepolymers which are convertible to heteroaromatic polymers, such as for example, polybenzoxazoles or polybenzimidazopyrrolones, may likewise be suitable for the invention. Polymers containing adamantane may likewise be suitable (especially the above prepolymers, containing adamantane units).

The heat treatment in the process of the invention may be generally carried out at temperatures lying in the range from about 300° C. to about 400° C. The heat treatment may be advantageously carried out in air in the temperature range between 300° C. and 600° C., while its duration may be between 5 and 120 minutes.

This heat treatment may moreover be carried out in at least two stages at different temperatures, with a first stage which is effected in air at a restricted temperature between 200° C. and 300° C., and at least one further stage, which is either effected in air in the temperature range between 300° C. and 600° C., or else in a non-oxidizing or inert atmosphere such as argon or nitrogen, at a temperature lying in the range between 400° C. and 900° C., with a duration which may vary between 15 minutes and 20 hours.

The catalytically activated particles obtained by the present invention may be useful in a variety of ways, as an electro-catalyst or as a chemical catalyst.

Thus, for example, these activated particles may be fixed to the surface of an electrode base in any suitable way, e.g. by means of an organic or inorganic binder.

These particles may also be consolidated, e.g. by applying a binder, pressure and/or heat, so as to form a porous electrode body.

The activated particles may also be used in discrete form, either as a fixed bed, or dispersed in a medium, e.g. as a fluidized bed.

The following examples illustrate the production and use of catalytically activated particles in accordance with the invention.

EXAMPLE 1

An activating solution was prepared by mixing 6 ml of a solution (I-A) comprising 13.3 g of polyacrylonitrile (PAN) per liter of dimethylformamide (DMF) with 3 ml of a solution (I-B) comprising 15.6 g $IrCl_3.H_2O$, 31 g $RuCl_3.H_2O$ and 12.5 ml HCl per liter of isopropylalcohol (IPA).

A mixture of titanium sponge particles (5 g having a particle size between 400 and 615 microns mixed with 3 g having a particle size between 160 and 140 microns) was then prepared, degreased with trichlorethylene and dried.

The titanium sponge mixture was then impregnated with the activating solution, dried in a furnace at 120° C. for 2 hours, and heat treated in air by raising the furnace temperature progressively to 250° C. and keeping it at that level for 10 minutes. The described impregnating, drying and heat treatment steps were repeated two more times. The titanium sponge mixture was then subjected to a final heat treatment by raising the furnace temperature from 250° C. to 420° C. and keeping it at that level for 10 minutes.

The resulting catalytically activated titanium sponge particles were partly embedded in the surface of a sheet of lead-silver alloy (0.5 % Ag) by uniformly spreading them out on the sheet surface and applying a pressure of 250 $kg/cm^2$ at room temperature.

An electrode sample was thus obtained with a lead-silver alloy base sheet uniformly covered with catalytically activated, partly embedded titanium sponge particles in an amount corresponding to 254 $g/m^2$ of activated particles with respect to the electrode sheet surface, with a noble metal loading corresponding to 0.79 g $Ir/m^2$ and 1.58 g $Ru/m^2$.

This electrode sample was tested as an oxygen evolving anode in $H_2SO_4$ (150 g p l) at a current density of 500 $A/m^2$ of the projected sheet area, and exhibited an anode potential of 1.7 V vs NHE (i.e. with respect to a Normal Hydrogen Electrode) after 600 hours of anodic operation at 500 $A/m^2$.

EXAMPLE 2

Catalytically activated particles were prepared in the manner described in Example 1, except that non-porous titanium particles were used in this case as the starting material, instead of titanium sponge as in Example 1.

These activated titanium particles were then partly embedded in the surface of a lead sheet, in the manner described in Example 1.

An electrode was thus obtained with a lead sheet base uniformly covered with activated, partly embedded titanium particles in an amount corresponding to 340 $g/m^2$ of the projected electrode sheet area, with a noble metal loading corresponding in this case to 1 g $Ir/m^2$ and 2 g $Ru/m^2$.

This electrode sample was tested as an oxygen evolving anode in the manner described in Example 1 and exhibited an anode potential of 1.82 V after 1000 hours of anodic operation of 500 $A/m^2$.

EXAMPLE 3

An activating solution was prepared by first mixing a solution (III-A) comprising 1 g $RuCl_3.H_2O$ and 0.2 ml HCl in 3 ml isopropylalcohol (IPA) with a solution (III-B) comprising 0.5 g $IrCl_3.H_2O$ and 0.2 ml HCl in 3 ml IPA, then dissolving 50 mg of polyacrylonitrile and a solution comprising 0.36 ml of the mixture previously obtained (IIIA+IIIB) in 4.57 g of dimethylformamide (DMF), and by finally diluting the resulting solution in three times its volume of DMF.

4 grams of titanium sponge with a particle size between 315 and 630 microns was degreased with trichlorethylene, and dried.

The titanium sponge was then impregnated with the activating solution, dried in a furnace at 100° C. for about 1 hour, and heat treated by raising the furnace temperature to 250° C. and keeping it at that level for 15 minutes. The described impregnating, drying, and heat treating steps were repeated three more times. An additional 3-stage heat treatment was then carried out at higher temperatures, with a first stage in which the furnace temperature was raised to 300° C. and kept at this level for 10 minutes, a second stage, in which it was next raised to 430° C. and kept at this level for 10 minutes, and a third stage in which it was lowered to 400° C. and kept at this level for 10 minutes.

The above-described treatment cycle comprising 4 impregnations, each followed by a heat treatment at 250° C., with an additional 3-stage heat treatment at higher temperature, was repeated once more, i.e. 2 such cycles were carried out with 8 impregnations altogether.

The resulting activated titanium sponge particles were partly embedded in the surface of a sheet of lead-calcium alloy (0.06 % Ca) by uniformly spreading them out on the sheet surface and applying a pressure of 260 kg/cm$^2$ at room temperature.

An electrode sample was thus obtained with a lead-calcium base sheet uniformly covered with catalytically activated, partly embedded titanium sponge particles fixed to the sheet surface in an amount corresponding to 824 g/m$^2$ of the projected to the electrode sheet area, with a noble metal loading corresponding to 11.1 g Ru/m$^2$ and 3.7 g Ir/m$^2$.

This electrode sample was tested as an oxygen evolving anode in $H_2SO_4$ (150 gpl) at a current density of 500 A/m$^2$ as described in Example 1. It exhibited an anode potential of 1.6 V vs. NHE after 2760 hours of anodic operation at 500 A/m$^2$ and no corrosion of lead was observed during this period.

EXAMPLE 4

An activating solution was prepared by first mixing 0.2 ml of a solution (IV-A) comprising 16.7 g of $RuCl_3.H_2O$ and 67 ml HCl per liter of isopropylalcohol (IPA), with 1,9 g of a solution (IV-B) comprising 200 g of polyacrylonitrile per liter of dimethylformamide (DMF), and then diluting the resulting solution in 3 times its volume of DMF.

4 grams of titanium sponge particles were prepared and activated with the solution, in the manner described in Example 3.

The resulting activated titanium sponge particles were then partly embedded in the surface of a lead-calcium alloy sheet as described in Example 3, but the pressure applied was 210 kg/cm$^2$ in this case.

An electrode sample was thus obtained with a lead-calcium base sheet uniformly covered with catalytically activated, partly embedded titanium sponge particles fixed to the sheet surface in an amount corresponding to 664 g/m$^2$ of the projected electrode sheet surface, with a noble metal loading corresponding to 10.4 g Ru/m$^2$.

This electrode sample was tested as an oxygen evolving anode in the manner described in Example 3.

It exhibited a low, stable oxygen potential of 1.68 V vs. NHE during 1300 hours of anodic operation at 500 A/m$^2$ and no corrosion of lead was observed during this period.

EXAMPLE 5

Catalytically activated titanium sponge particles were prepared in the manner described in Example 3 and were subjected to compression at 370 kg/cm$^2$, so as to form a consolidated porous electrode plate sample with a geometric surface area of about 14 cm$^2$ on each side and a thickness of 1 mm.

This electrode sample was tested as an oxygen evolving anode in $H_2SO_4$ (150 gpl) at a current density of 1000 A/m$^2$ of the projected geometric plate surface. It exhibited a stable oxygen potential of less than 2 V vs NHE during 400 h of operation at 1000 A/m$^2$.

We claim:

1. A process for converting particles of solid inert support material to particles having a catalytically active and stable surface comprising the steps of:
   (a) wetting said particles of inert support material with an activating solution in an organic solvent of an organic prepolymer which can be thermally converted to an insoluble, electrically conducting polymer and an inorganic precursor which can be thermally converted to a platinum group catalyst,
   (b) drying said particles to remove said solvent therefrom, and subjecting them to heat treatment so that said catalyst is obtained in finely dispersed form uniformly distributed within a matrix of the insoluble, electrically conducting polymer formed in situ on each of said particles and firmly attached thereto.

2. The process of claim 1, characterized in that said inert support material consists essentially of a valve metal.

3. The process of claim 2, characterized in that said valve metal is titanium.

4. The process of claim 1, characterized in that said inert support material is a valve metal oxide.

5. The process of claim 1, characterized in that said organic precursor is polyacrylonitrile.

6. The process of claim 1, characterized in that said organic precursor is poly-p-phenylene.

7. The process of claim 1, characterized in that said heat treatment is carried out at a temperature from about 300° C. to about 900° C.

8. The process of claim 7, characterized in that said heat treatment is carried out in air at a temperature in the range from about 300° C. to about 600° C.

9. The process of claim 8, characterized in that the duration of said heat treatment in said temperature range lies between 5 and 120 minutes.

10. The process of claim 1, characterized in that said particles are subjected to drying and heating for complete removal of said solvent therefrom.

11. The process of claim 1, characterized in that said heat treatment is carried out in two successive stages, with a first stage which is effected in air at a temperature in the range between 200° and 300° C. and a second stage which is effected in air at a temperature between 300° and 600° C., or in a non-oxidizing atmosphere at a temperature between 400° and 900° C.

12. The process of claim 1 wherein said inorganic precursor is a salt of a platinum group metal.

13. The process of claim 1 wherein said particles of inert support material are porous.

14. The process of claim 1 wherein said particles are titanium sponge of a few to several hundred microns in size.

* * * * *

UNITED STATES PATENT AND TRADEMARK OFFICE
CERTIFICATE OF CORRECTION

PATENT NO. : 4,454,169

DATED : June 12, 1984

INVENTOR(S) : Jean Hinden et al.

It is certified that error appears in the above-identified patent and that said Letters Patent is hereby corrected as shown below:

The term of this patent subsequent to September 6, 2000, has been disclaimed.

Signed and Sealed this

Fifth Day of February 1985

[SEAL]

Attest:

DONALD J. QUIGG

Attesting Officer     Acting Commissioner of Patents and Trademarks